United States Patent
Gaultier et al.

(10) Patent No.: US 10,428,869 B2
(45) Date of Patent: Oct. 1, 2019

(54) SUSPENSION THRUST BEARING DEVICE

(71) Applicant: Aktiebolaget SKF, Gothenburg (SE)

(72) Inventors: Stephane Gaultier, Sonsay (FR); Xavier Blanchard, Saint-Cyr-sur-Loire (FR); Bruno Montboeuf, Saint-Cyr-sur-Loire (FR); Desire Vidot, Ballan-Miré (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 16/009,405

(22) Filed: Jun. 15, 2018

(65) Prior Publication Data
US 2018/0372152 A1  Dec. 27, 2018

(30) Foreign Application Priority Data

Jun. 26, 2017  (DE) .................. 10 2017 210 728

(51) Int. Cl.
| | |
|---|---|
| *F16C 19/10* | (2006.01) |
| *F16C 33/38* | (2006.01) |
| *F16C 27/06* | (2006.01) |
| *F16C 19/30* | (2006.01) |

(52) U.S. Cl.
CPC ............ *F16C 19/10* (2013.01); *F16C 27/066* (2013.01); *F16C 33/3887* (2013.01); *F16C 19/305* (2013.01); *F16C 2326/05* (2013.01)

(58) Field of Classification Search
CPC ........ F16C 19/10; F16C 19/12; F16C 19/163; F16C 27/066; F16C 27/08; F16C 2326/05; B60G 15/04
See application file for complete search history.

(56) References Cited

U.S. PATENT DOCUMENTS

| | | | | |
|---|---|---|---|---|
| 2008/0179160 A1* | 7/2008 | Beauprez | ............. | B60G 15/068 192/70.17 |
| 2010/0014792 A1* | 1/2010 | Kellam | ................ | B60G 15/067 384/196 |
| 2016/0089946 A1* | 3/2016 | Bedeau | ................ | B60G 15/063 248/634 |
| 2017/0261032 A1* | 9/2017 | Lepine | ................ | B60G 15/068 |

FOREIGN PATENT DOCUMENTS

| | | |
|---|---|---|
| EP | 2152531 A2 | 2/2010 |
| EP | 3002136 A1 | 4/2016 |
| EP | 3199390 A1 | 8/2017 |
| FR | 2915930 A1 * | 11/2008 ........... B60G 15/068 |

* cited by examiner

*Primary Examiner* — Phillip A Johnson
(74) *Attorney, Agent, or Firm* — Bryan Peckjian; SKF USA Inc. Patent Dept.

(57) ABSTRACT

A suspension thrust bearing device for use with a suspension spring in an automotive suspension strut, and having a bearing with an upper annular part and a lower annular part. The lower annular part includes an axial hub and an outwardly projected radial flange extending from the axial hub, and the lower part has an exterior support surface that axially supports an upper end of a suspension spring by the intermediate of a damping device. The damping device provides an axial portion secured to an axial hub, and a radial portion secured to a radial flange. The axial hub of the lower annular part has a plurality of radially through recesses that are axially open on an axial lower end of the axial hub. The axial portion of the damping device includes a plurality of pins that radially inwardly protrude from the axial portion.

8 Claims, 2 Drawing Sheets

SUSPENSION THRUST BEARING DEVICE

CROSS-REFERENCE

This application claims priority to German patent application no. 102017210728.6 filed on Jun. 26, 2017, the contents of which are fully incorporated herein by reference.

TECHNOLOGICAL FIELD

The present invention concerns a suspension thrust bearing device, in particular of the MacPherson type, the so-called "MacPherson Suspension Bearing Unit" or MSBU. The invention also concerns a motor vehicle equipped with such a suspension thrust bearing device. The field of the invention is that of suspension systems, in particular for motor vehicles.

BACKGROUND

As a general rule, a motor vehicle suspension system comprises a suspension strut supporting an axle and a vehicle wheel. A suspension thrust bearing device is disposed in an upper portion of the suspension strut, opposite to the wheel and the ground, and between a suspension spring and an upper support block attached to the body of the vehicle. The device includes at least one rolling bearing. The suspension thrust bearing enables transmission of axial forces between the spring and the body of the vehicle and, in the meantime, allows relative angular movement between the spring, which is mobile in rotation, and the fixed support block attached to the body.

To this end, the spring is supported by a spring seat provided on the suspension thrust bearing. More precisely, the suspension thrust bearing comprises a lower support surface resting on ending coils of the spring. The spring support surface comprises a radial surface to support axial force. The spring support surface may also comprise a tubular axial surface to support radial deformations and to ensure the spring centering.

It is known to provide a damping device axially and radially disposed between the spring and the spring support surface of the suspension thrust bearing. As shown in these documents, the damping device is attached and/or integrated to the lower surface of the suspension thrust bearing. Damping device is made from a resilient material, such as rubber, thermoplastic elastomer (TPE), in particular thermoplastic polyurethane (TPU), melt processible elastomer (MPE) or elastomer cellular foam.

The damping device can be a separate component assembled in place by hand as part of the spring support surface. Alternatively, the damping device can be directly molded onto the spring support surface. Nevertheless, shocks and vibrations exerted by the spring during the use of vehicle can disassembled the damping device from the suspension thrust bearing.

The document US 2010/0014792 A1 proposes annular grooves supported by the spring seat, the damping device comprising a corresponding shape fitted within the grooves. However, the damping device and the spring seat may relatively rotate one to the other. The damping device material is softer than the spring seat and then it could be worn.

The document EP 2 152 531 B1 discloses longitudinal grooves blocking the rotation of the damping device. Furthermore, the longitudinal grooves comprise flaring side walls so as to prevent radial movement of the damping device. However, such grooves have a relative complex design.

Another disadvantage of the prior art documents is that radial and axial ends of damping device can separate from support surface. Mechanical cling, in particular by grooves and pins, and chemical cling, in particular by overmolding, between damping device and support surface are not robust enough in case of heavy torque, stress, and/or load. Damping device may separate at least locally from support surface, with the consequence of inefficient damping of spring and, in the worst case, relative rotation between the damping device and support surface.

SUMMARY

The aim of the invention is to provide an improved suspension thrust bearing with a damping device of optimized fixing means, in particular at radial and axial ends.

To this end, the invention concerns a suspension thrust bearing device dedicated for use with a suspension spring in an automotive suspension strut. The suspension thrust bearing comprises a bearing with upper and lower annular parts in relative rotation. The lower annular part comprises an axial hub and an outwardly projected radial flange extending from the axial hub. The lower annular part comprises an exterior support surface that axially supports an upper end of a suspension spring by the intermediate of a damping device made from resilient material. Damping device comprises an axial portion secured to axial hub, and a radial portion secured to radial flange.

According to the invention, axial hub of lower annular part comprises a plurality of radially through recesses that are axially open on axial lower end of the axial hub, the recesses having each a transverse wall with a portion flaring from outer face of the hub. Axial portion of damping device comprises a plurality of pins that radially inwardly protrude from the axial portion, are each of corresponding shape with and fit within the recesses of axial hub.

Thanks to this invention, the damping device is prevented from any movement relatively to the lower part. More precisely, lateral walls of through recesses prevent the rotation of damping device with respect to the annular part. Transverse wall of each through recess has a flaring shape to prevent the radial separation of pins from axial hub. The recesses being open at axial end of lower part, the free end of the axial portion of damping device is prevented to separate from lower part.

The arrangement of the elements according to the invention, and in particular the position and the shape of the through recesses, permit a robust suspension thrust bearing before (during transport for example) and during its service life.

According to further aspects of the invention which are advantageous but not compulsory, such a suspension bearing device may incorporate one or several of the following features:

Suspension thrust bearing comprises a bearing with an inner ring fixed to an upper cup, forming the upper annular part of the device, and an outer ring fixed to a lower cup, forming the lower annular part of the device, the lower cup being provided with support surface with damping device.

At least one row of rolling elements is arranged between inner and outer rings.

Rolling elements are balls. Alternatively, rolling elements are rollers or needles.

Suspension thrust bearing is a sliding bearing.

The inner and outer rings are made from a stamped metal sheet.

Upper and lower cups are made from a rigid plastic material.

Upper and/or lower annular parts comprise a rigid stiffening insert.

Damping device is directly molded on the lower part.

Damping device is made from a resilient material, such as rubber, thermoplastic elastomer (TPE), in particular thermoplastic polyurethane (TPU), melt processible elastomer (MPE) or elastomer cellular foam.

Axial hub further comprises a plurality of blind holes only outwardly open, damping device comprising a plurality of radial pins that are each of corresponding shape with and fit in the blind holes.

Blind holes are radially cylindrical.

Blind holes comprise each a first portion radially oriented towards the interior of suspension thrust bearing device, and of larger dimension in transverse cross section than a second portion oriented in opposite direction and open to damping device.

Blind holes of axial hub are dovetail shaped in transverse cross section.

Radial flange of lower annular part comprises a plurality of axially through holes in the vicinity of outer radial end of lower annular part, damping device comprising a plurality of axial pins that are each of corresponding shape with and fit in the recesses.

Axially through holes extend through a stiffening insert of lower annular part.

Axially through holes comprise each a first portion axially oriented towards the upper annular part, and of larger dimension in transverse cross section than a second portion oriented in opposite direction and open to damping device.

Axially through recesses are dovetail shaped in transverse cross section.

Radially through recesses of axial hub are circumferentially equally spaced.

Blind holes of axial hub are circumferentially equally spaced.

Axially through holes of radial flange are circumferentially equally spaced.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
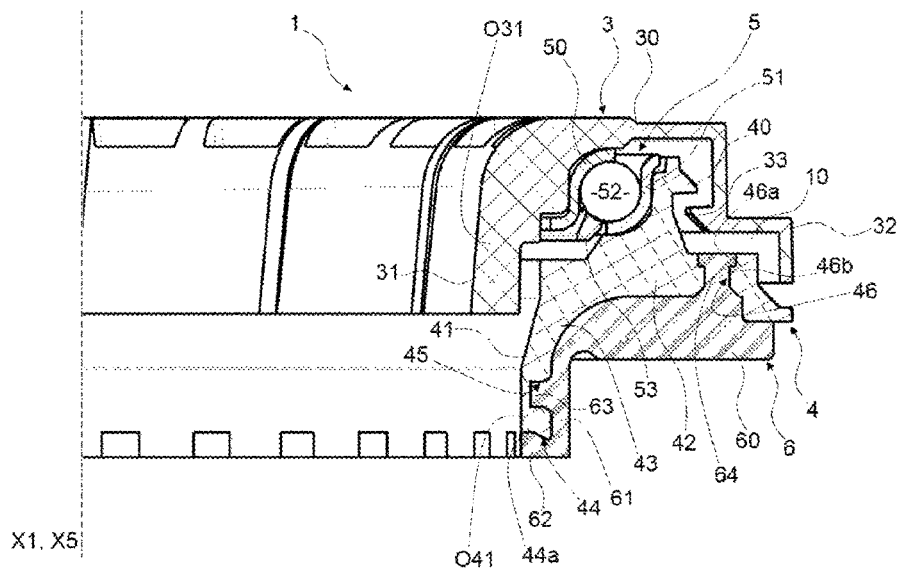
FIG. 1 is a sectional half-view of a suspension bearing device according to a first embodiment of the invention, comprising a bearing, a lower cup and an upper cup.

FIG. 1 shows a suspension thrust bearing device 1 according to the invention and its constitutive elements. Device 1 has an overall shape of revolution around a central axis X1. Device 1 is mounted between a coil spring (not shown) on lower axial side, and a support block (not shown) on lower axial side and connected to the chassis of a motor vehicle. Such suspension thrust bearing device 1 can be used, for example, in an automotive MacPherson strut assembly.

Hereinafter, the adjectives "axial" and "radial" are defined relative to the central axis X1 of the annular device 1. The terms "interior" and "exterior" are also defined relative to the central axis X1. The interior side of device 1 is oriented towards the axis X1 while the exterior side of device 1 is oriented in towards the opposite direction to the axis X1.

Suspension thrust bearing device 1 comprises an upper cup 3, a lower cup 4 and a single rolling bearing 5. In this embodiment, these three components 3, 4 and 4 are of globally circular shape about a central axis X5 coinciding with the central axis X1 when the suspension thrust bearing device 1 is not loaded.

Upper cup 3 consists in a one-piece part made from plastic synthetic material, for example from polyamide, optionally reinforced with glass fibers. Upper cup 3 has an upper radial portion 30, an inner annular skirt 31 of relatively small diameter and extending towards the lower axial side of device 1, and an outer annular skirt 32 of relatively large diameter and extending towards the lower axial side of device 1.

Inner skirt 31 defines an inner bore O31 for the device 1 wherein an elongated shock absorber rod (not shown) is dedicated to be mounted.

Outer skirt 32 comprises a hook 33 that may be continuous or discontinuous in the circumferential direction, taking the form of an axial projection towards the lower cup 4.

Upper cup 3 is dedicated to be fixed to a support block of the automotive vehicle chassis.

Rolling bearing 5 comprises a pressed sheet metal inner ring 50, an outer ring 51 also of pressed sheet metal, a row of rolling elements 52, here balls, and a cage 53 for maintaining a regular circumferential spacing between the rolling elements 52. Rolling elements 52 are disposed between raceways formed by toroidal portions of the inner ring 50 and outer ring 52. As an alternative not shown, other rolling elements than balls can be used, such as rollers. According to another alternative, no rolling elements need to be used but rather the inner and outer rings may directly contact each other, with a suitable low friction material, coating, or lubricant being used.

Rolling bearing 5 is integrally radially located between the inner skirt 31 and the outer skirt 32 of upper cup 3. The inner ring 50 is fitted within a corresponding toroidal inner portion of upper cup 3. Outer ring 51 is fitted onto a toroidal outer portion of the lower cup 4.

Figure 2:
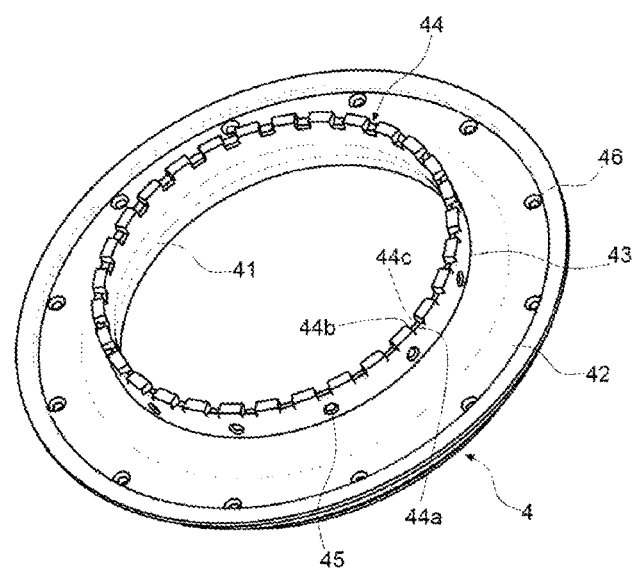
FIG. 2 is a perspective bottom view of the lower cup.

Lower cup 4 is illustrated in FIG. 2 and comprises an axial hub 41 defining an inner bore O41 wherein the rod axially extends. Inner skirt 31 of upper cup 3 axially partly extends within the bore O41 of axial hub 41 of lower cup 4. Outer cup 4 further comprises an outwardly radially projecting flange 42 that extends from the hub 41 towards the exterior of the suspension thrust bearing device 1. Lower cup 4 comprises a curved connecting portion 43 between the axial hub 41 and radial flange 42.

The toroidal outer portion that supports the outer ring 51 of rolling bearing 5 is provided on an upper surface of the radial flange 42 of lower cup 4.

Lower cup 4 further comprises an outer annular rib 40 that outwardly radially extends from flange 42. Rib 40 of lower cup 4 cooperates with hook 33 of upper cup to guarantee axial retention of upper and lower cups together between which the rolling bearing 5 is clamped. Furthermore, flange 42, rib 40, outer skirt 32 and hook 33 define an outer labyrinth seal 10 between outer cup 3 and lower cup 4. Outer labyrinth seal 10 prevents the entry of water, particles and dirt of the exterior of device 1 in the radial space defined between the cups.

Lower cup 4 is further provided with a damping device 6 dedicated to support a non-illustrated spring.

Damping device 6 is made from a resilient material such as rubber thermoplastic elastomer (TPE), in particular thermoplastic polyurethane (TPU), melt processible elastomer (MPE) or elastomer cellular foam.

Damping device 6 comprises a radial portion 60 and a tubular axial portion 61.

Radial portion 60 comprises an upper surface tightly fastened to a lower surface of radial flange 42 of lower cup 4. On the axial opposite side, radial portion 60 comprises a lower surface dedicated to receive an end turn of a suspension spring in bearing contact. The radial portion 60 of damping device 6 is dedicated to support axial loads and shocks from the suspension spring.

Axial portion 61 axially extends from a bore of radial portion 60 of damping device 6 towards the lower axial side of the suspension thrust bearing unit 1. The axial portion 61 comprises an inner surface tightly fastened to an outer surface of axial hub 41 of lower cup 4. On the radial opposite side, axial portion 61 comprises an outer surface dedicated to support axial movements of suspension spring.

Radial portion 60 and axial portion 61 of damping device 6 are formed integral and cover the exterior surfaces of axial hub 41, radial flange 42, and curved connecting portion 43 of lower cup 4.

According to the invention, axial hub 41 of lower annular cup 4 comprises a plurality of radially through recesses 44.

Recesses 44 extend radially through the entire thickness of hub 41 and are radially open on both radial sides. Recesses 44 are further axially open on axial lower end of the axial hub 41, the recesses 44 having each a transverse wall 44a with a portion flaring from outer surface of the hub 41. Recesses 44 further define each lateral walls 44b and 44c.

Axial portion 61 of damping device 6 comprises a plurality of pins 62 that radially inwardly protrude from the inner surface 61a of the axial portion 61. Pins 62 are each of corresponding shape with and fit within the recesses 44 of axial hub 41. In particular, pins 62 comprise each an upper sloped surface cooperating with the transverse wall 44a, and two side surfaces cooperating with the lateral walls 44b and 44c of recesses 44.

Lateral walls 44b 44c of through recesses 44 block in rotation side walls of pins 62, so as to prevent the rotation of damping device 6 with respect to the annular cup 4. Transverse wall 44a of each through recess 44 has a portion of flaring shape to block any radial outwards movement of pin 62. The recesses 44 being open at axial end of lower part 4, the free end of the axial portion 61 of damping device 6 is prevented to radially separate from the lower cup 4.

Advantageously, through recesses 44 of lower cup 4 and corresponding pins 62 of damping device 6 are circumferentially equally spaced. Alternatively, recesses 44 and pins 62 may be unevenly distributed.

According to an advantageous embodiment of the present invention, axial hub 41 further comprises a plurality of blind holes 45 only outwardly open. Blind holes 45 are closed on the interior side of hub 41. Damping device 6 comprises a plurality of radial pins 63 that are each of corresponding shape with and fit in the blind holes 45.

Blind holes 45, and then pins 63, are of any suitable shape, and can be radially cylindrical for example.

As an alternative not illustrated, blind holes are dovetail shaped in transverse cross section. Blind holes define two transverse walls flaring from outer surface of hub, the pins of damping device comprising upper and lower sloped surfaces of corresponding shapes. Such cooperating pins and blind holes prevent any radial outwards movement of radial portion of damping device with respect to hub of lower annular cup. Alternatively, blind holes may have only one sloped transverse wall in transverse cross section.

Blind holes 45 of lower cup 4 and corresponding radial pins 63 of damping device 6 are circumferentially equally spaced. Alternatively, blind holes 45 and pins 63 may be unevenly distributed.

According to another advantageous embodiment of the present invention, radial flange 42 of lower annular cup 4 comprises a plurality of axially through holes 46 in the vicinity of outer radial end the lower annular cup 4. Holes 46 extend axially through the entire thickness of flange 42 and are radially open on both radial sides. Damping device 6 comprises a plurality of axial pins 64 that are each of corresponding shape with and fit in the holes 46.

Advantageously, the axial holes 46 have a shape to prevent any downside axial separation of pins 64 from the recesses. Axial holes 46 may have a dovetail shape similarly to radial blind holes 45. Axial holes 46 can also have a first portion 46a axially oriented towards the upper annular cup 3, and of larger dimension in transverse cross section than a second portion 46b oriented in opposite direction and open to damping device 6.

Advantageously, axial through holes 46 of lower cup 4 and corresponding axial pins 64 of damping device 6 are circumferentially equally spaced. Alternatively, holes 46 and pins 64 may be unevenly distributed.

Cooperating pins 62, 63 and 64 and recesses 44, 45 and 46, respectively guarantee the retention of damping device with respect to the lower annular cup 4 in any axial, radial and rotational direction. More particularly, radial and axial ends of damping device are firmly attached to lower cup 4 and are prevented to separate before and during service life of the suspension thrust bearing device 1.

Advantageously, the damping device 6 is directly overmolded onto the exterior surfaces of lower part 4. It induces a chemical cling to increase robustness of the fixation of damping device 6 with the lower part 4.

Figure 3:
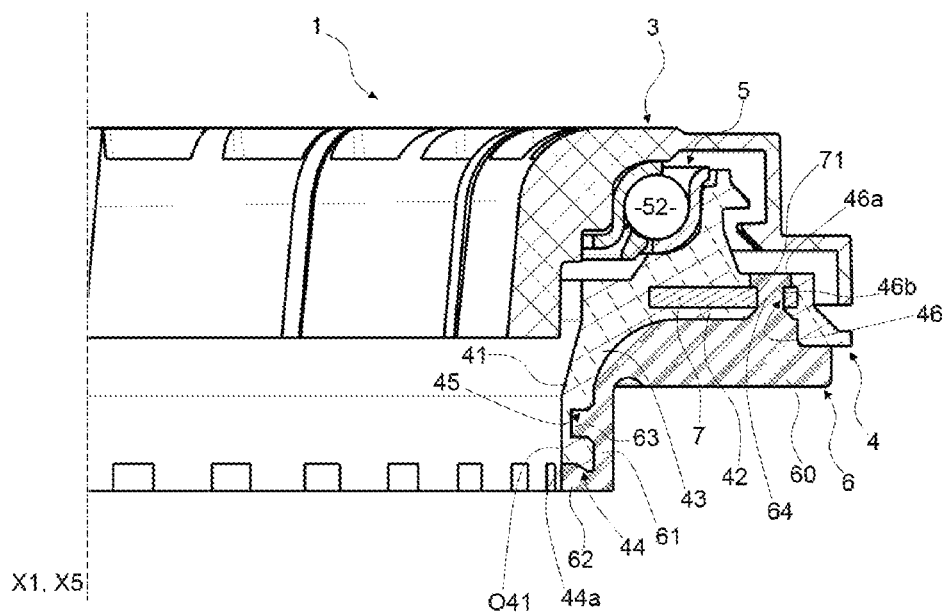
FIG. 3 is a sectional half-view of a suspension bearing device according to a second embodiment of the invention.

A second embodiment of the invention is illustrated in FIG. 3, wherein the same elements have the same reference numbers, and differs from the previous embodiment of FIGS. 1 and 2 in that the lower cup 4 comprises a radial stiffening insert 7 along the radial flange 42.

Radial stiffening insert 7 is made from a rigid material, such as metal or rigid plastic, and supports axial loads and shocks exerted by a spring. As an alternate not shown, insert may further comprise an axial portion extending within the axial hub 41 of lower cup 4.

According to this embodiment of the invention, radial stiffening insert 7 comprises a plurality of radial through holes 71. Each hole 71 is radially aligned with a corresponding axial through hole 46 of radial flange 42.

Axial pins 64 of radial portion 60 of damping device 6 axially extend through the holes 46 and holes 71.

As an alternate not shown, suspension thrust bearing unit may further comprise sealing means between the upper and lower cups. The sealing means may be provided on the interior and/or exterior sides of the radial space defined between the cups. Advantageously, sealing means may comprise a portion fixed to the upper cup and provided with a lip in sliding contact with the lower cup. Outer labyrinth seal may be replaced by such sealing means.

Representative, non-limiting examples of the present invention were described above in details with reference to the attached drawings. This details description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved suspension bearing devices.

Moreover, various features of the above-described representative examples, as well as the various independent and dependent claims below, may be combined in ways that are not specifically and explicitly enumerated in order to provide additional useful embodiments of the present teachings.

What is claimed is:

1. A suspension thrust bearing device for use with a suspension spring in an automotive suspension strut, the thrust bearing device comprising:
    a bearing with an upper annular part and a lower annular part in relative rotation with respect to each other, the lower annular part having an axial hub and an outwardly projected radial flange extending from the axial hub, and the lower part having an exterior support surface that axially supports an upper end of a suspension spring by the intermediate of a damping device made from resilient material, the damping device providing an axial portion secured to the axial hub, and a radial portion secured to the radial flange, wherein
    the axial hub of the lower annular part includes a plurality of radial through recesses that are axially open on axial lower end of the axial hub, the recesses each having a transverse wall with a portion flaring from outer face of the hub, and wherein
    the axial portion of the damping device provides a plurality of pins that protrude radially inward from the axial portion, the pins are each of corresponding shape with and fit within the recesses of axial hub.

2. The suspension thrust bearing device according to claim 1, further comprising:
    a rolling bearing with an inner ring fixed to an upper cup, forming the upper annular part of the device,
    an outer ring fixed to a lower cup, forming the lower annular part of the device,
    at least one row of rolling elements disposed between the inner ring and outer ring, and
    the lower cup being provided with the support surface and with the damping device.

3. The suspension thrust bearing device according to claim 1, wherein damping device is directly molded on the lower part.

4. The suspension thrust bearing device according to claim 1, wherein the axial hub further comprises a plurality of blind holes only outwardly open, the damping device comprising a plurality of radial pins that are each of corresponding shape with and fit in the blind holes.

5. The suspension thrust bearing device according to claim 4, wherein the blind holes of axial hub are dovetail shaped in transverse cross section.

6. The suspension thrust bearing device according to claim 1, wherein the radial flange of the lower annular part comprises a plurality of axial through holes in an outer radial end of the lower annular part, the damping device comprising a plurality of axial pins that are each of corresponding shape with and fit within the recesses.

7. The suspension thrust bearing device according to claim 6, wherein the lower annular part comprises a rigid stiffening insert, the axial pins of the damping device extending axially through holes of the insert and through the axial holes of the lower annular part.

8. The suspension thrust bearing device according to claim 6, wherein each of the axial through holes of lower part comprise each a first portion axially oriented towards the upper annular part, and of larger dimension in transverse cross section than a second portion oriented in opposite direction and open to damping device.

* * * * *